Dec. 11, 1928.
H. SAUVEUR
1,694,628
STOOL FOR INSERTING STUD BOLTS
Filed Feb. 11, 1927
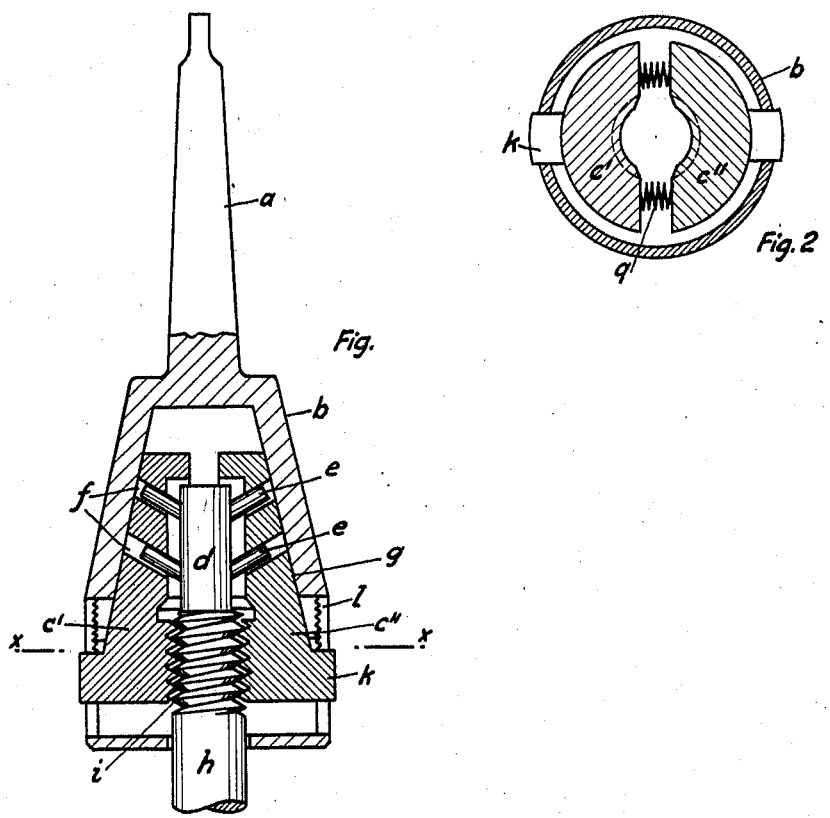
Inventor
Harry Sauveur Patented Dec. 11, 1928.

1,694,628

UNITED STATES PATENT OFFICE.

HARRY SAUVEUR, OF BERLIN, GERMANY.

TOOL FOR INSERTING STUD BOLTS.

Application filed February 11, 1927, Serial No. 167,562, and in Germany February 13, 1926.

My invention relates to tools for inserting stud bolts by means of a chuck comprising jaws for engaging the end of the bolt, and it is an object of my invention to provide a tool of this type which is free to yield in case of any irregularity.

To this end, I provide an operative connection in said chuck by which said jaws are engaged positively in one direction only but are free to yield in the opposite direction.

Tools of this type comprise a slide adapted to engage the end of the bolt and to cause the threaded ends of the jaws to engage the thread of the bolt under the influence of the relative axial displacement of the slide and the chuck. A lug extending vertically to the axis of the tool transfers the relative motion of the slide and the tool to the jaws which slide on inclined faces of the chuck.

These old tools, however, involve the drawback that tilting moments will occur which not only cause jamming but also wear and consequently shorter life of the tool. Another drawback of the old tools is due to the fact that the axial distance of the slide from any part of the thread in the jaws is variable during the motion of the parts, with the consequence that the thread of the bolt is not engaged properly in any position of the tool with respect to the bolt, and so the thread of the bolt is damaged.

For instance, when, as is often the case, the upper slopes of the jaw thread engage the lower slopes of the bolt thread, the bolt thread is liable to be damaged because the jaw thread holds the slide engaged with the bolt so that the threads of the bolt will be sheared off.

By providing, as in my invention, a connection between the three parts, viz: the slide, the thread of the jaws, and the bolt which is positive in respect of contracting the jaws upon the stud, but enables relative longitudinal movement of the jaws and slide, these drawbacks are eliminated.

The problem may be solved in various ways. For instance, means may be provided for varying the relative distance of the slide and any part of the jaw thread during the relative motion of the slide and the tool. In this case, any detrimental reaction of the jaws on the thread of the bolt is eliminated, whatever may have been the position of the bolt with respect to the jaws when the tool is placed in position, and notwithstanding the reaction of the bolt on the slide. This condition is fulfilled by arranging one or more lugs on the slide at an angle which is equal to, or substantially equal to, the angle of the thread slope.

In the drawing, a tool embodying my invention is illustrated diagrammatically by way of example.

Figure 1 is an elevation, partly in section, of a tool having a slide with inclined lugs.

Figure 2 is a section on the line $x$—$x$ in Figure 1.

Referring now to the drawing, and first to Fig. 1, the tool comprises a Morse cone $a$ and a casing $b$ which is conical on the inside at $g$ and, with the jaws $c'$ and $c''''$, and the slide $d$, constitutes the chuck. The jaws are threaded at their inner ends and their outer faces engage the conical face of the casing $b$, and $k$ are projections on the jaws which, by engaging slots $l$ in the casing, prevent rotation of the jaws but permit axial displacement. $q$, Fig. 2, are springs inserted between the jaws to keep them asunder and engaged with the inner face of the casing $b$.

$d$ is a slide inserted between the upper ends of the jaws and adapted to engage the bolt $h$ when the tool is lowered onto the bolt, and $e$ are inclined lugs on the slide $d$ which engage in holes $f$ of the jaws. When the slide is in position on the bolt $h$ and the tool is depressed further the lugs $e$ will cause the jaws to close on the thread $i$ of the bolt. As soon as they have closed the further displacement of the jaws is effected by the reaction of the thread slopes and the slide $d$ becomes inactive because the lugs $e$ and their holes $f$ are inclined in parallel relation to the slope of the thread and the holes have some play at the opposite sides to those where they engage the jaws so that the jaws are free to move axially in the direction opposite to that in which they are engaged by the lugs.

I claim:

1. A tool for inserting stud bolts comprising a casing, a slide adapted to be axially displaced in said casing and to engage the stud bolt, threaded jaws adapted to be displaced radially and axially in said casing, lugs on said slide, and faces inclined at an angle equal to the slope of the thread of the bolts and adapted to be engaged by said lugs, on said jaws.

2. A tool for inserting stud bolts, comprising a casing having a tapered bore, tapered jaws adapted to engage a bolt fitting in said tapered bore, a slide, and means positively engaging said slide with said jaws inclined at approximately the angle of the bolt threads.

3. A tool for inserting stud bolts comprising a casing having a tapered bore, tapering blocks fitting said bore and having threaded jaws to engage the thread of a bolt, a slide adapted to be positively engaged by the end of the bolt, and pins upon said slide projecting at the angle of the thread slope and loosely engaging in holes in said blocks, also inclined at the angle of the thread slope.

In testimony whereof I affix my signature.

HARRY SAUVEUR.